United States Patent [19]
Biehl et al.

[11] Patent Number: 5,448,635
[45] Date of Patent: Sep. 5, 1995

[54] WIRING SCHEME AND NETWORK ADAPTER WITH DIGITAL AND ANALOG OUTPUTS TO ALLOW OLD POTS COEXISTENCE WITH ISDN

[75] Inventors: Robert E. Biehl, Boynton Beach; Charles C. Hallock, Gulf Stream; Joe F. Jones, Jr., Boca Raton; Robert E. Landa, Boca Raton; Baiju D. Mandalia, Boca Raton; Charles H. Sederholm, Lighthouse Point, all of Fla.

[73] Assignee: International Business Machines Corporation, Armonk, N.Y.

[21] Appl. No.: 85,333

[22] Filed: Jun. 30, 1993

[51] Int. Cl.⁶ .................................. H04M 11/06
[52] U.S. Cl. .................................. 379/399; 379/339; 379/93; 370/110.1; 370/60
[58] Field of Search ............... 379/399, 339, 96, 96; 370/110.1, 60

[56] References Cited

U.S. PATENT DOCUMENTS

| | | |
|---|---|---|
| 4,853,949 | 8/1989 | Schorr et al. ............... 379/2 |
| 4,884,269 | 11/1989 | Duncanson et al. ............ 370/110.1 |
| 4,885,769 | 12/1989 | Beierle ........................ 379/210 |
| 4,924,492 | 5/1990 | Gitlin et al. .................. 379/93 |
| 4,932,022 | 6/1990 | Kenney et al. ............... 370/60 |
| 4,970,723 | 11/1990 | Lin .......................... 370/110.1 |
| 4,972,463 | 11/1990 | Danielson et al. ............. 379/91 |
| 5,023,869 | 6/1991 | Grover et al. ................. 370/84 |
| 5,138,657 | 8/1982 | Colton et al. ................ 379/220 |
| 5,157,656 | 10/1992 | Turudic et al. ................ 370/84 |
| 5,191,456 | 3/1993 | Sutherland et al. ............ 359/118 |
| 5,195,125 | 3/1993 | Bliven et al. ................. 379/29 |
| 5,289,538 | 2/1994 | Laver et al. ................. 379/399 |

Primary Examiner—James L. Dwyer
Assistant Examiner—Jacques M. Saint-Surin
Attorney, Agent, or Firm—Romualdas Strimaitis; Anthony N. Magistrale

[57] ABSTRACT

A network adapter and wiring scheme makes use of existing plain old telephone service (POTS) wiring to provide support between analog devices within the subscriber premise and an Integrated Digital Service Network (ISDN). Moreover, the network adapter and wiring scheme provides further support between digital devices within the premise and the ISDN while concurrently supporting analog devices.

8 Claims, 6 Drawing Sheets

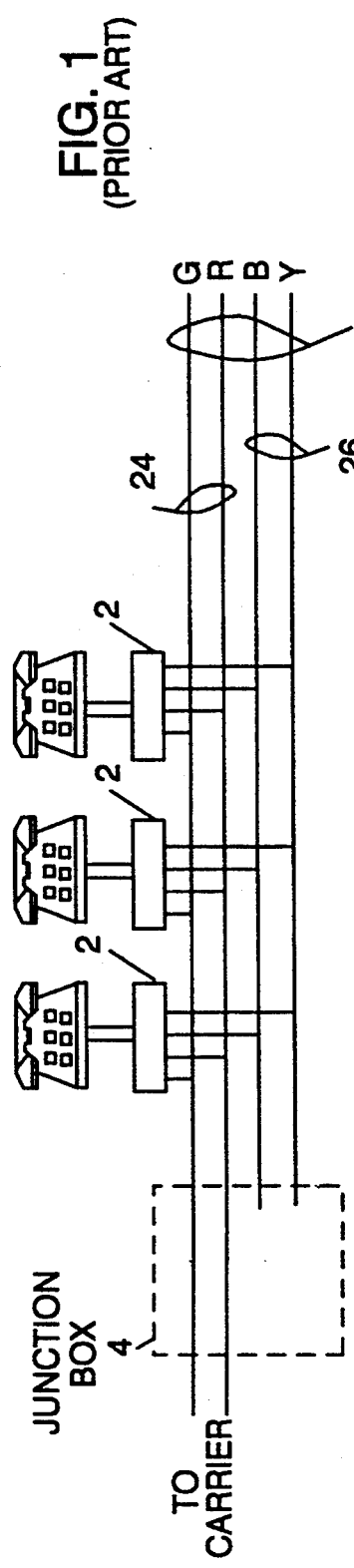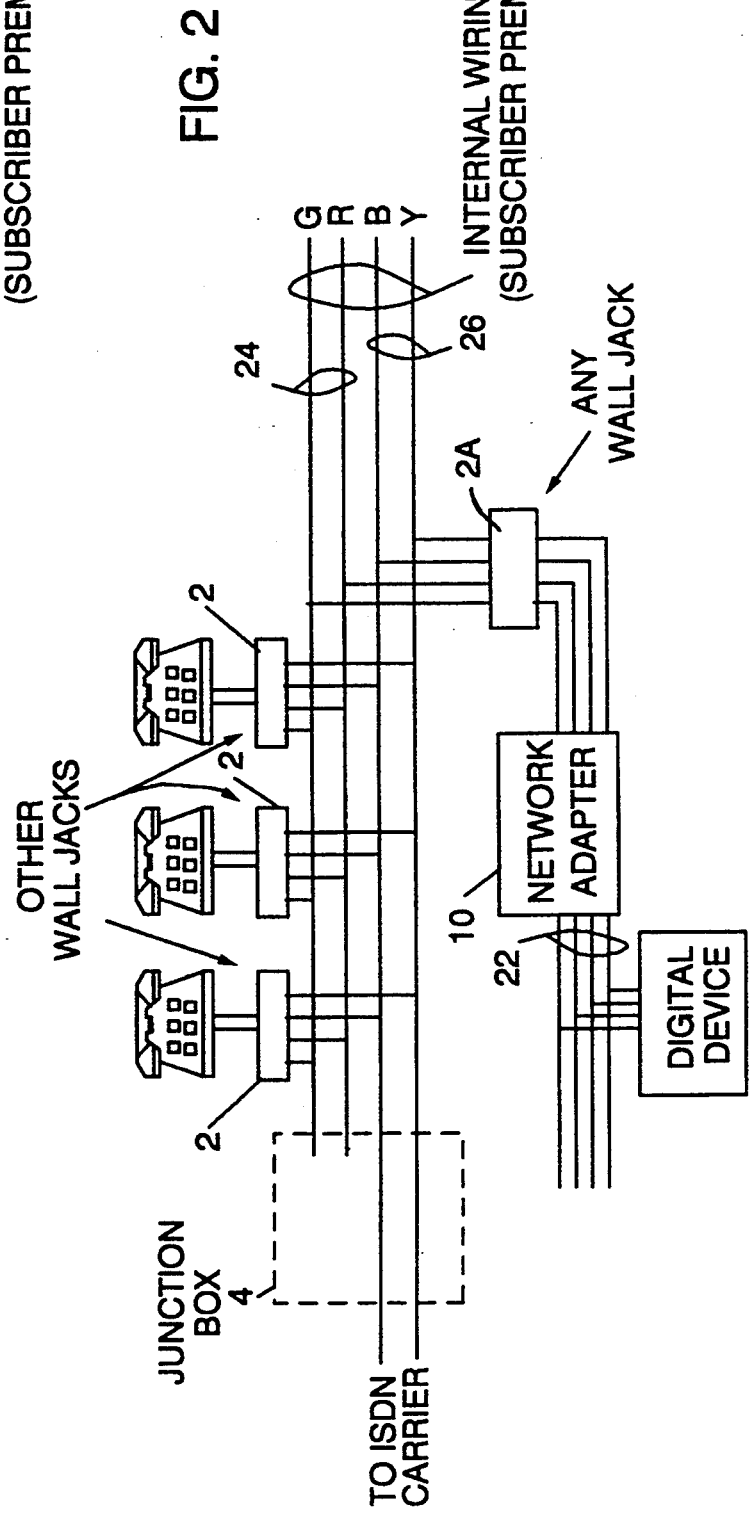

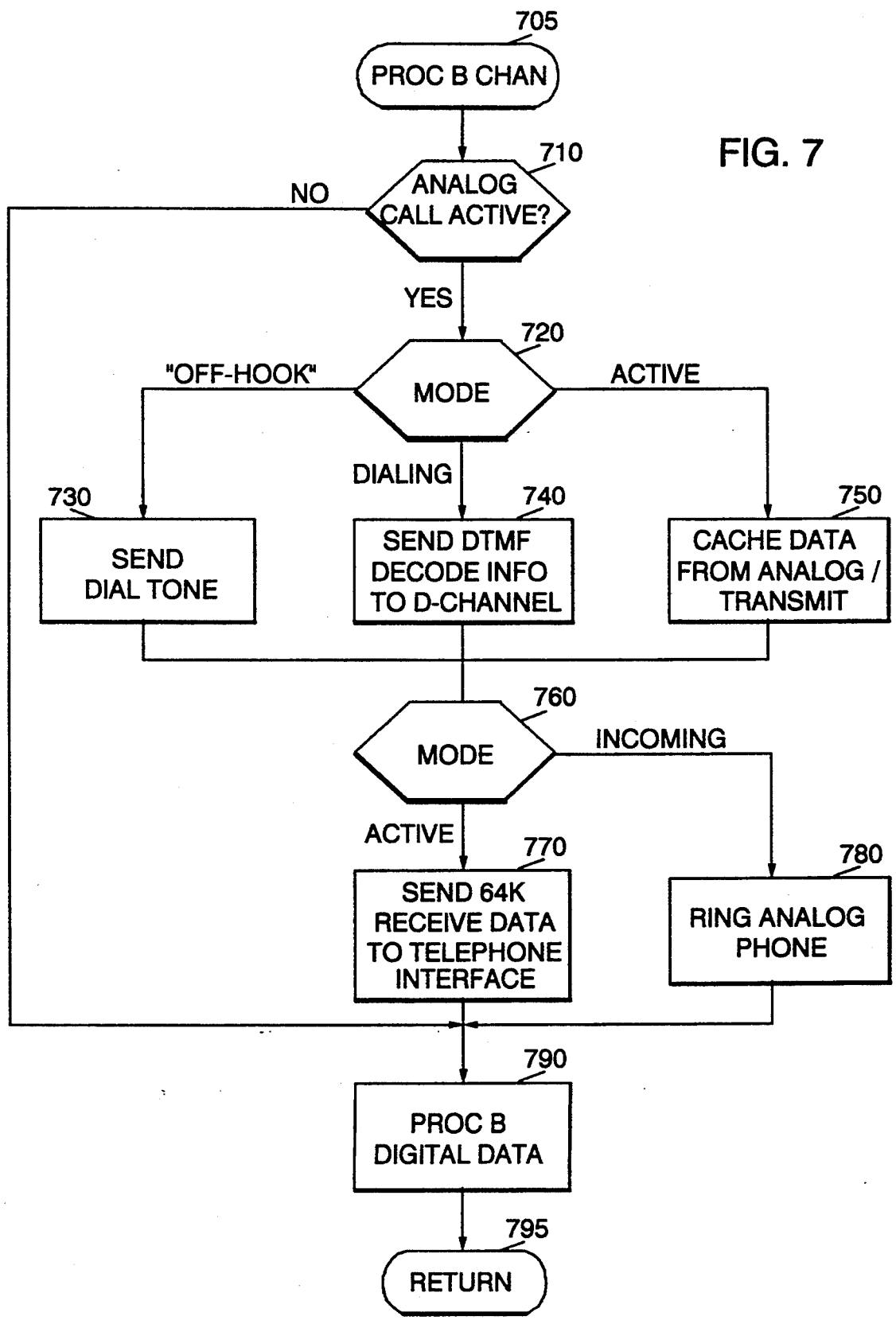

WIRING SCHEME AND NETWORK ADAPTER WITH DIGITAL AND ANALOG OUTPUTS TO ALLOW OLD POTS COEXISTENCE WITH ISDN

FIELD OF THE INVENTION

This invention relates to communication systems and more particularly to telephone systems which utilize existing plain old telephone service (POTS) wiring in providing both analog and digital telephone service within a subscriber premise.

BACKGROUND OF THE INVENTION

This invention relates generally to integrated services digital networks (ISDN), and particularly to accommodating analog and digital equipment over existing wiring in a subscriber premise (office, house, etc.) having a single line ISDN subscription.

ISDN is defined by internationally accepted standard digital network user interfaces. The resulting network offers a variety of subscriber access lines capable of supporting services including voice, data, facsimile, and video. There are two CCITT (International Telegraph and Telephone Consultative Committee) recommended standard integrated services digital network interfaces for user access. They include the basic rate interface (BRI) and a primary rate interface (PRI). By integrating these various services on a single transport system means, the subscriber avoids buying multiple services to meet multiple service needs. As a practical consideration a single transport system requires less overhead than providing a discrete access line for each service, and results in a total lower cost of service.

An ISDN Basic Rate Interface (BRI) consists of three channels, referred to as two B channels plus a D channel (2B+D), in which all signals flowing over the external TELCO lines are carried in a baseband digital form and in a standardized frame format. With this arrangement, the B channels are the basic user channels which carry digital voice, high-speed data, and other functions at a maximum channel rate of 64 kbps. The D channel bit rate in this interface is 16 kbps and may serve two purposes. First, the D channel carries control signalling information to control circuit-switched calls on associated B channels at the user interface. In addition, the D channel may be used for packet switching or low speed telemetry when not carrying signalling information. Accordingly, an ISDN Primary Rate Interface (PRI) consists of multiple B channels and one 64 kbps D channel having primary rates of either 1544 kbps (23 B+D) and 2048 kbps (30 B+D).

The BRI may be arranged to provide simultaneous voice and data services in several ways giving users flexibility in configuring their services. A user may use each B channel for voice service, for circuit switched data transport, or for packet switched data services. The D channel can carry packet switched data which interleaves data packets with signaling packets. The BRI may provide a maximum of either two data B channels or one voice B channel and another voice or data channel.

Typically, a single line subscriber premise is wired with two discrete pairs of wires, sometimes referred to as plain old telephone service (POTS). In the POTS configuration, one pair of signal wires (typically green and red) provides a communication path between analog terminal equipment and a junction box that interfaces to external telco wiring. Another pair of signal wires (typically black and yellow) provides a second, or spare, path between analog terminal equipment and the external junction box.

Coexistence between analog and digital terminal equipment at a customer premise has heretofore been impractical. As one solution, discrete digital and analog classes of service to the subscriber premise are provided in order to offer support to both analog and digital devices. Thus, when a single line subscriber elects to add ISDN service, the junction box connection (between, for example, the green/red wires and external TELCO lines) typically remains fixed, but internal POTS wiring is either bypassed or elaborately modified in order to provide a communication path for digital ISDN signals if only one pair of pre-existing wires exists. This solution requires not only bypassing or elaborately modifying the existing POTS wiring, but it also requires maintaining and paying for two discrete classes of service.

As an alternate solution, a single line subscriber may elect to convert from an analog to a digital class of service. In that scenario, the subscriber premise is converted to accommodate digital terminal equipment only. In so doing, the subscriber is compelled to scrap pre-existing conventional telephone (POTS) wiring and terminal equipment, which had effectively become useless, in order to maintain a single (digital) class of service.

Accordingly, it is an object of the present invention to provide an architecture and apparatus that offers a single line communication path between digital and analog devices of a single subscriber and an external ISDN network, through existing internal POTS wiring. It is a further object of the present invention to provide an architecture and apparatus which supports concurrent service to both digital and analog devices through existing POTS wiring.

SUMMARY OF THE INVENTION

The present invention provides an architecture and apparatus for connecting both analog and digital devices in a subscriber premise to a single subscription line in an ISDN network, using existing POTS wiring in the premises. A first set of POTS wires is connected to the ISDN network while a second set of POTS wires connects analog devices and is not connected directly to the ISDN network.

An adapter is connectable to both sets of POTS wires by way of a plug, or otherwise, through a first connecting means, and can process analog and digital signals. The first set of POTS wires provides a communication path for ISDN signals between the ISDN network and the adapter. The second set of POTS wires provides a communication path for analog signals between analog devices and the adapter. Digital devices may be connected to the adapter by way of a second connecting means.

The adapter further includes a means for converting signals transferred between the adapter and the first and second connecting means. Communications between analog devices and the ISDN network is sustained via the first connecting means, the adapter, and the first and second sets of POTS wires. Communications between digital devices and the ISDN network is sustained via the first set of POTS wires, the first connecting means, the adapter, and the second connecting means. All signals are converted between forms uniquely suited to the ISDN network, analog devices, or digital devices.

BRIEF DESCRIPTION OF THE DRAWING(S)

FIG. 1 illustrates a schematic overview of a prior art embodiment of plain old telephone service (POTS) wiring within a subscriber premise.

FIG. 2 illustrates a schematic overview of an embodiment the wiring scheme and network adapter of the present invention.

FIG. 7 is a flow chart illustrating the processing of B channel data for the network adapter according to the present invention.

DESCRIPTION OF THE ILLUSTRATIVE EMBODIMENT(S)

Figure 3A:
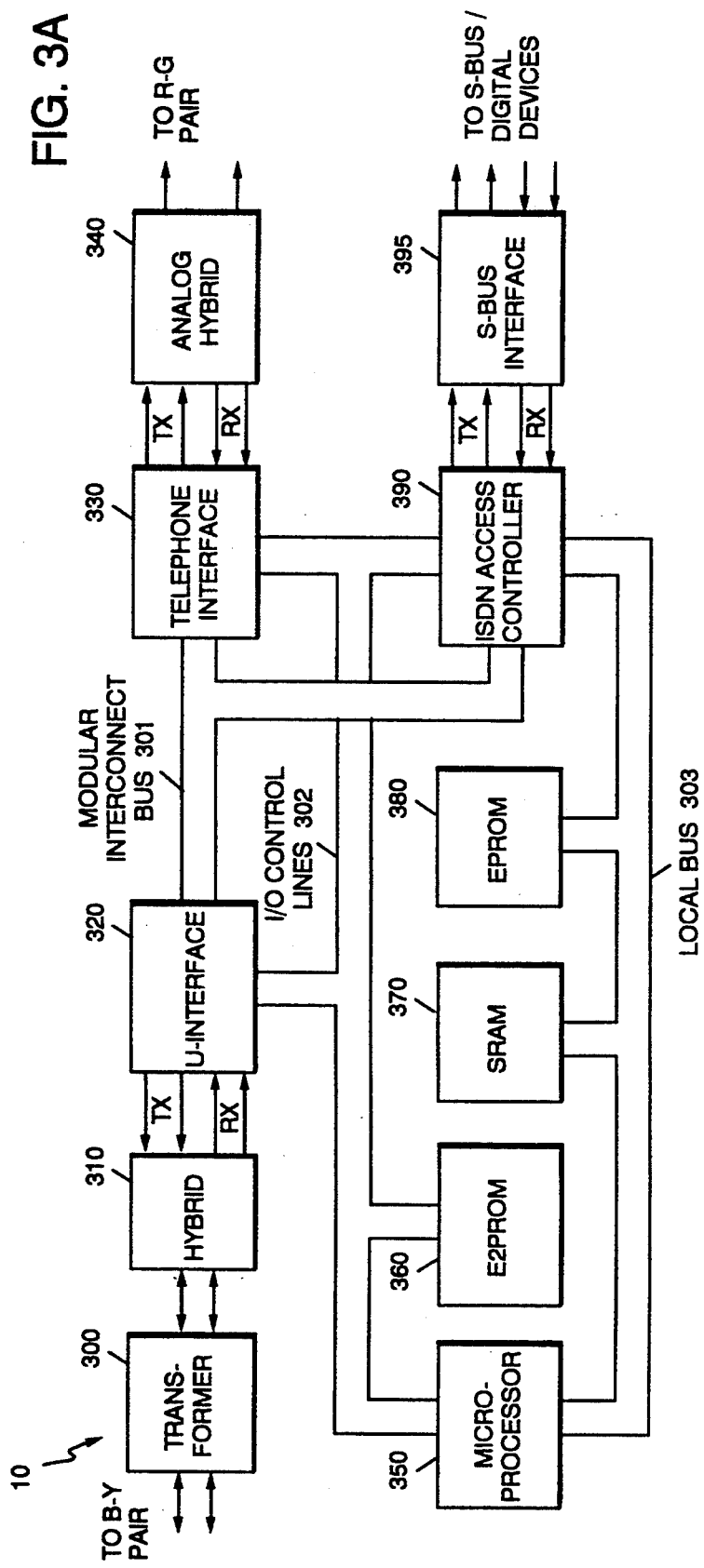
FIG. 3A is a block diagram illustrating an implementation of the network adapter according to the present invention.

POTS wiring in a subscriber premise typically comprises four signal wires as shown in FIG. 1. These wires extend to a junction box 4 that connects the customer premise to the carrier network. Inside the premise, these wires terminate at modular telephone jacks 2 located in the walls of the subscriber premise. In a typical configuration, a Green-Red (G-R) pair of wires 24 provides an interface between the carrier network and analog terminal equipment, while a Black-Yellow (B-Y) pair of wires 26 is normally idle and available as an interface for a second or spare line.

FIG. 2 illustrates an arrangement for linking both analog and digital devices to a single subscription line in an ISDN network, using pre-existing telephone wires 24, 26. Telco carrier network wiring at the junction box 4 is connected to the spare pair of wires 26 and isolated from the formerly through-connected pair of wires 24. In addition, a network adapter 10 is plugged into any wall jack 2A (any one of the modular telephone jacks 2 in the POTS arrangement of FIG. 1). The network adapter 10 then serves as an interface between two wire subscriber loop signals on wires 26 in a standardized digital form, and S-bus 22 through which digital devices are connected. The digital and analog interface network adapter 10 also serves as an interface between two wire subscriber loop signals on wires 26, in the standardized digital form, and analog devices that connect to the G-R wire pair 24 via other wall jacks 2 (jacks other than jack 2A).

According to the preferred embodiment of the present invention, the B-Y pre-existing wire pair 26 is adapted at the junction box 4 to interface with the Telco ISDN carrier network. Likewise, the G-R pre-existing wire pair 24 is isolated from direct interface to the ISDN carrier network by disconnecting the pair at the junction box 4. In so doing, the G-R wires are "open" at the junction box but connected uniformly to analog devices. The wiring change at the junction box may be adapted by manually changing the wires at the junction box.

With the arrangement as described in FIG. 2, the S-bus wiring can be provided with a (usually short) cable extending from network adapter 10 to digital equipment located near the adapter (usually one device or set of devices sharing a single network port). Accordingly, the network adapter 10 is plugged into a modular telephone jack 2A at any desired (room, wall) location and the telco carrier interface is adapted as shown. The S-bus shown need not extend through any walls if all digital devices are in the same room as the adapter. However, the wiring scheme may require extended (additional) S-bus wiring for additional digital devices and terminal adapters.

With this arrangement, all signals flowing between the external telco carrier network and the customer premise are channeled through the network adapter 10 (via the internal B-Y pair 26 and the inside jack 2A to which the network adapter 10 is connected). All signals flowing between the network adapter 10 and digital devices run through the S-bus 22 interface between the network adapter 10 and the digital devices. All signals flowing between the network adapter 10 and any analog device run through the R-G pair 24 between the jack 2A, at which the network adapter 10 is connected, and another jack 2, at which the analog device is connected.

It should be understood that with this arrangement, signals flowing between any analog device and the external carrier network pass in analog form through the R-G pair linking the jack 2, at which the analog device is connected, to the adapter 10; get converted in the adapter 10 between analog and two wire digital ISDN forms; and pass in the latter form between the adapter 10 and the external carrier network, via the internal B-Y pair of wires 26 and the junction box 4. Signals flowing between any digital device and the external telco lines pass in digital form between the device and the adapter 10 via the S-bus 22; get converted in the adapter 10 between four wire S-bus digital form and two wire digital ISDN form; and pass in the latter form between the adapter 10 and the external carrier network, via the B-Y pair 26 and the junction box 4.

FIG. 2 illustrates internal wiring at the subscriber premise configured as a single loop. With the single loop configuration, analog devices may be connected to the junction box 4 at any one of the modular telephone jacks 2 along the loop. It should be understood that alternate internal wiring configurations may be found at the subscriber premise, with another configuration presently contemplated being a star wiring configuration. With the star wiring configuration, a jack 2 at any branch of the star configuration may individually connect an analog device to the junction box 4 (configuration not shown).

Referring now to the drawings, particularly to FIG. 3A, number 10 refers to the block diagram of the digital and analog network adapter architecture constructed according to the teachings of the present invention. The circuit includes a system microprocessor 350 which is connected by I/O control lines 302 to an E2PROM 360, U interface device 320, telephone interface 330 and ISDN access controller 390. While any appropriate microprocessor can be used, one suitable microprocessor is the 8031 which is sold by Intel. A suitable U interface device 320 is the PEB 2091; a suitable telephone interface 330 is the PEB 2160; a suitable ISDN access controller is the PEB 2086. Each of the PEB devices is sold by Siemens Components, Inc.

Continuing with the description of FIG. 3A, a local bus 303 further connects the system microprocessor 350, SRAM 370, and EPROM 380. The local bus 303 comprises conductors used for transmitting address, data, or control signals between interconnected devices.

Figure 3B:
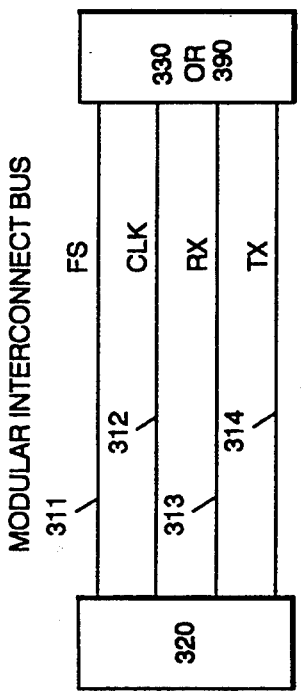
FIG. 3B is a block diagram illustrating a modular interconnect bus used in the network adapter according to the present invention.

Referring still to FIG. 3A, modular interconnect bus 301 interconnects the U interface 320, telephone interface 330, and ISDN access controller 390. As seen in FIG. 3B, modular interconnect bus 301 consists of four discrete signal lines including a 8 Khz frame sync (FS) signal line 311, data clock (CLK) line 312, receive serial bit stream (RX) signal line 313, and a transmit serial bit stream (TX) signal line 314. While modular interconnect bus 301 serves to connect the U interface 320, telephone interface 330, and ISDN access controller 390, bus 301 may also be used to connect other diverse voice/data modules (sources or targets for the D channel, or sources or targets for the B1 and B2 channels).

The U interface device 320 is further connected to an input transformer 300 through a hybrid 310. The input transformer 300 is connectable to one pair of "through-connected" pre-existing telephone wires 26 within the subscriber premise and acts as a transformer and driver to the telephone network. As such, the "through-connected" pair of telephone wires 26 is operatively connected to the telephone network but not coupled to any analog devices within the subscriber premise. The pair of wires 26 may be the B-Y pair, according to the typical POTS configuration, as described.

Thus, a signal coming from the telco network is first adapted at transformer 300 for input to the hybrid 310, where the signal is split into discrete transmit and receive signals. Partial cancellation of local echo and correct impedance matching to a four wire input for the U interface 320 is further performed by hybrid 310.

The U interface 320 further conditions the incoming signal by performing echo cancellation and equalization on the four wire digital signals received, and converts the signals into a TTL level binary stream which contains digital information. The echo cancellation with hybrid (ECH) principle is one which supports full duplex operation over a two wire subscriber loop. The ECH method and resultant TTL level binary stream are in conformance with ANSI standard T1.601.

In the preferred embodiment, the network adapter architecture 10 has been configured to interface with a BRI ISDN. The U interface 320 is of the type to accommodate a 2B1Q, or other standard digital channelized form as required by the local telephone network. For 2B1Q line coding, for example, pairs of bits are represented as one of four quantum levels. This is a four level pulse amplitude modulation (PAM) code without redundancy. The coded signal is a two wire subscriber loop signal characterized as having a frequency spectrum which is lower than the frequency spectrum of an uncoded digital signal. The two wire subscriber loop signal offers reduced line attenuation and crosstalk over the ISDN. In so doing, an 80 Khz 2B1Q two wire subscriber loop signal at the U interface may be converted into two discrete 160 kHz signals (transmit and receive).

The ISDN access controller 390 is connected by S-bus interface 395 to S-bus 22. Interface 395 comprises a four wire interface at the S-bus 22 for connecting one or more digital devices within the subscriber premise. S-bus interface 395 contains a four wire transformer that supports up to eight digital devices according to the ANSI T1.605 standard.

The telephone interface 330 is further connectable by analog hybrid 340 to the other pair of pre-existing telephone wires 24 within the subscriber premise. The other pair of pre-existing telephone wires 24 is operatively connected to analog devices within the subscriber premise; e.g., the G-R pair in the typical POTS configuration, as described. The other pair of pre-existing telephone wires 24, as distinguished from the first pair of pre-existing wires 26, is connected only to existing analog devices within the subscriber premise (at jacks other than jack 2A). In the preferred embodiment, the analog hybrid 340 is a subscriber line interface circuit providing drive, on-hook, and off-hook functions to the analog devices and telco network.

It is to be understood that elements in network adapter 10 are connectable to both pairs of pre-existing telephone wires 24, 26 through any modular telephone jack 2A. That is, a single plug serves to connect the network adapter 10 to both the carrier network and analog devices.

Figure 4:
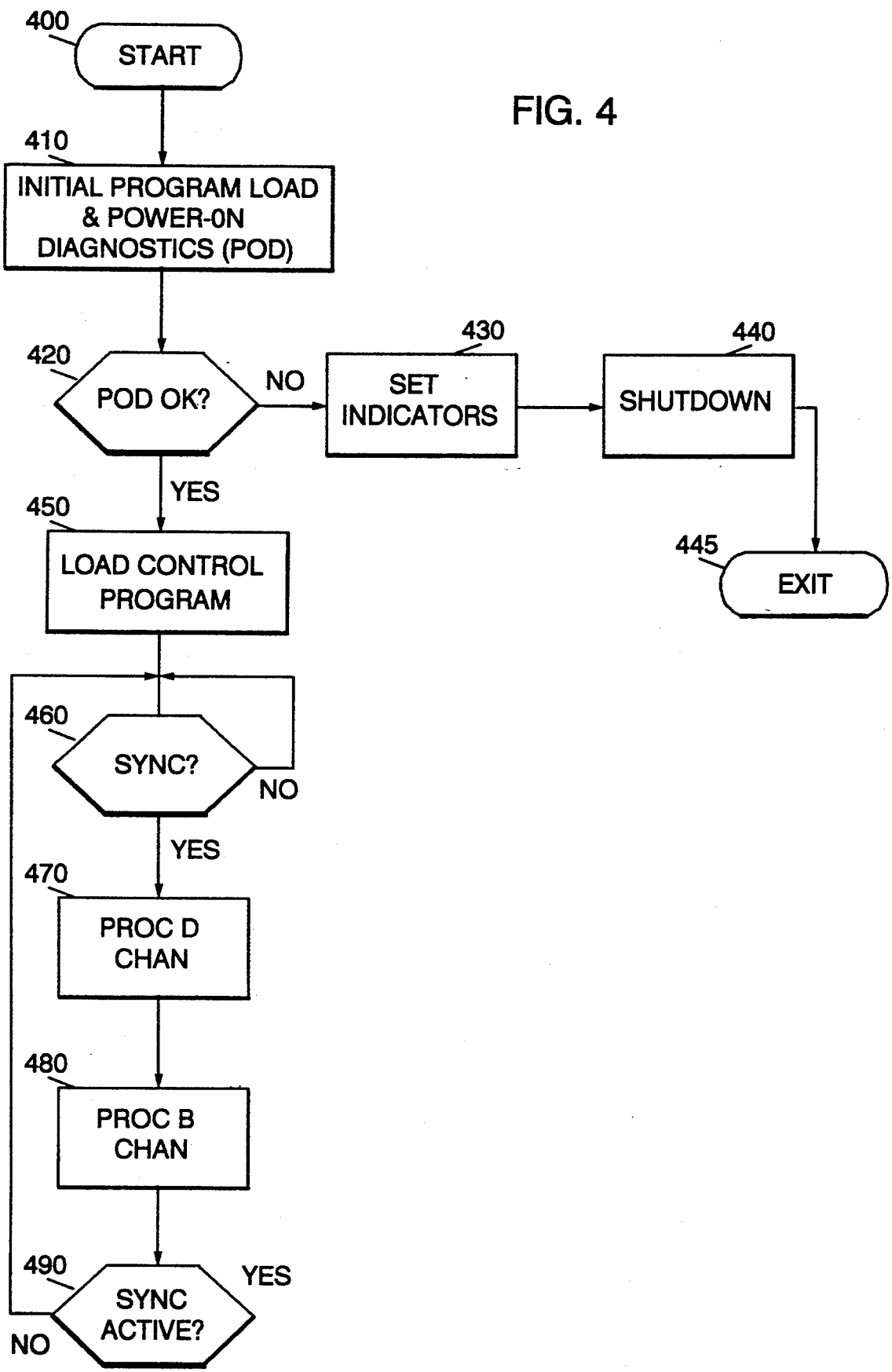
FIG. 4 is a flow chart illustrating the processing of data for the network adapter according to the present invention.

System microprocessor 350 controls its internal operation as well as interfacing with other elements of the network adapter 10. Referring now to FIG. 4, there is illustrated a flow chart including the basic process steps used by microprocessor 350 in controlling the operation of the elements of the network adapter 10 as well as the flow of analog and digital signals between U interface of the ISDN and digital and analog devices. The coding of the process steps of this flow chart into the instructions suitable to control the microprocessor 350 will be understandable to one having ordinary skill in the art of programming.

The flow chart of FIG. 4 is begun at start block 400, and the EPROM 380 (FIG. 3A) is adapted to store initial program load code, operational code, and power on diagnostics as indicated by block 410. Under normal circumstances, the initial program load routine loads power on diagnostics from EPROM 380 into SRAM 370 at a specific address, indicated at step 410, and then vectors the system processor to begin executing power on diagnostics. The microprocessor 350 then checks whether the power on diagnostics routine has properly compiled and executed, and if has not, the NO branch is taken from the decision block 420 to blocks 430 and 440 to set indicators and shutdown the network adapter 10 and ended at exit block 445.

Referring back to block 420, if the power on diagnostics routine has properly executed, the YES branch is taken from the decision block 420 to block 450 where the microprocessor 350 loads initial program information (control program and operational code) from EPROM 380 into SRAM 370 at a specific address. The power on diagnostics and initial program load are well known routines. Moreover, the actual sequence of steps need not necessarily be limited to that described and may be otherwise arranged or combined.

Upon initialization and loading of initial program information, timing between network adapter 10 and the carrier network is checked, and if not in sync, the NO branch is taken from decision block 460 where the "return" output of block 460 is reapplied as input to the same block 460 which causes the logic to loop in a "ready" or "wait" state until synchronized timing between the network adapter and ISDN is established. However, if the network adapter 10 and carrier network are determined to be in sync, the YES branch is taken from decision block 460 to block 470 labeled "PROC D CHAN" where the microprocessor 350 processes D channel control information located in a D channel buffer in the ISDN access controller 390. Having processed D channel data, the output of block 470 serves as input to block 480 labeled "PROC B CHAN" where the microprocessor 350 processes B channel digital voice or high-speed data. The specific control functions of the adapter 10 at blocks 470 and 480 are illustrated in further detail in FIGS. 5 through 7, and for the purpose of this description convert two wire subscriber loop signals carried on the one pair of pre-existing conventional telephone wires 26 between the standardized digital form used by the carrier network and an analog form used by analog devices on the other pair of pre-existing pair of telephone wires 24; and between the standardized digital form used by the carrier network and a digital form used by digital devices on the S-bus 22.

Figure 5:
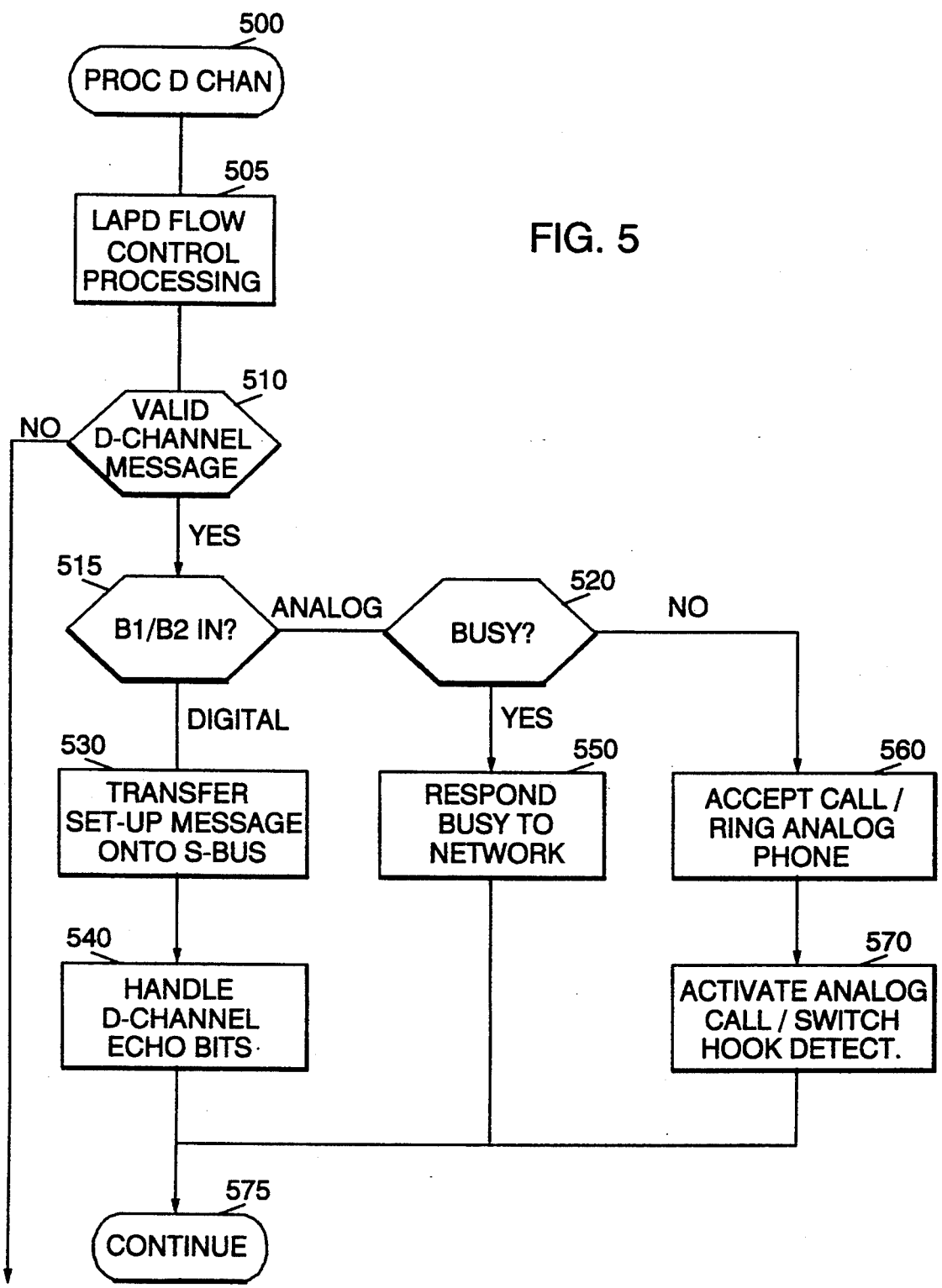
FIGS. 5 and 6 are flow charts illustrating the processing of D channel data for the network adapter according to the present invention.
Figure 6:
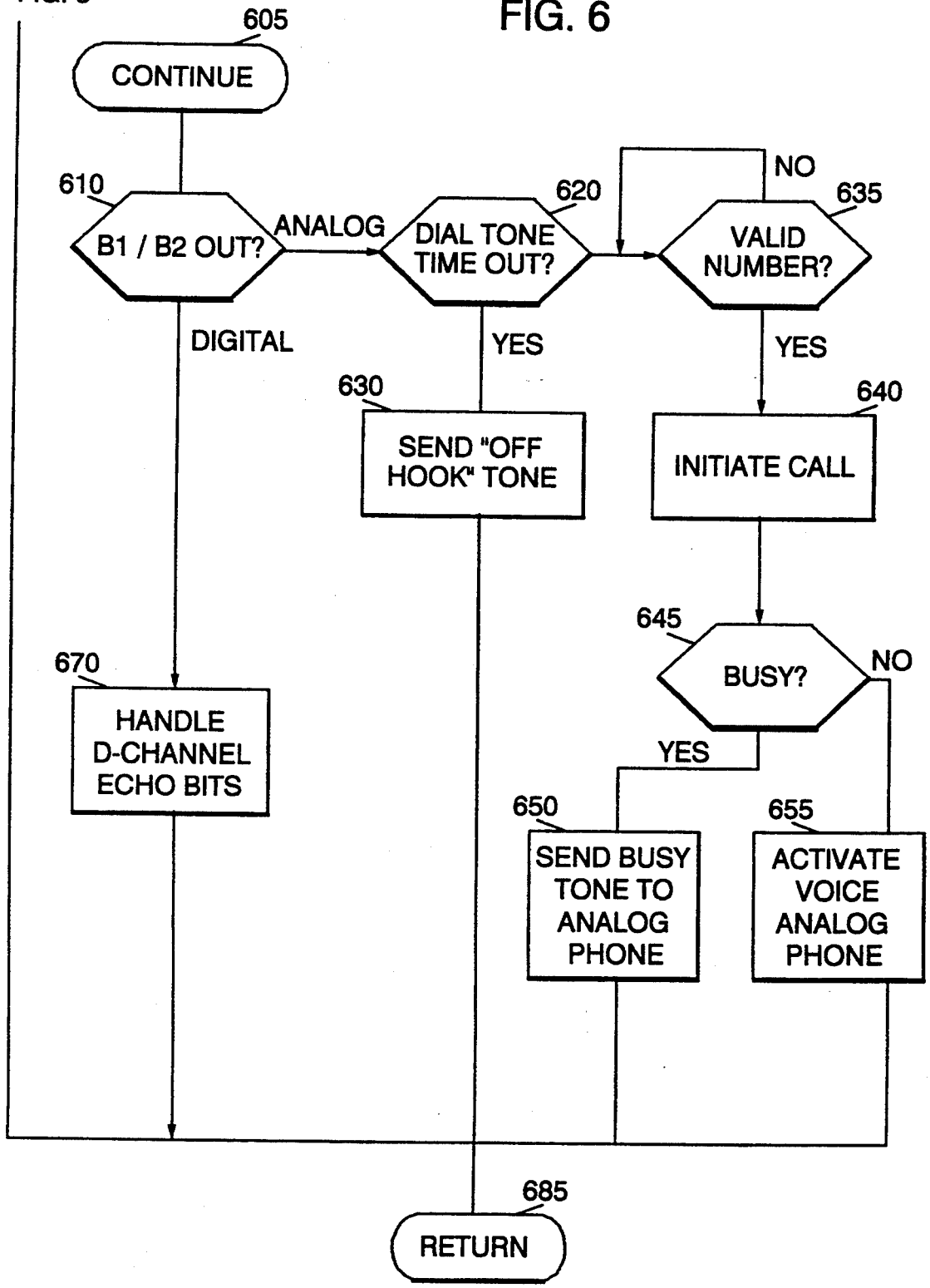

Referring now to FIGS. 5 and 6, flow diagrams are provided to illustrate in detail the operation of the microprocessor 350 during blocks shown at 470 in FIG. 4 when D channel control for the flow of analog and digital signals between U interface of the ISDN and digital and analog devices is actually occurring. Again, the coding of the process steps used by the microprocessor 350 into instructions suitable to control the microprocessor 350 will be understood by one having ordinary skill in the art.

Entering the flow chart at a start block 500, the microprocessor 350 uses LAPD protocol within the ISDN access controller 390 to process D channel data at block 505. Call processing of this data is performed according to CCITT spec Q.931 which comprises processing carrier network and adapter 10 functions for both incoming and outgoing calls. The microprocessor 350 determines first whether a valid D channel message is present. If no message is present, the NO branch is taken from decision block 510 to block 685 (FIG. 6). Otherwise, the YES branch is taken to block 515 where the nature of incoming B channel signal to be processed is determined. If an analog call is detected, the ANALOG branch is taken from the decision block 515 to block 520, where the status of the targeted analog device addressed by the incoming call is determined. If the targeted device is busy, the YES branch of decision block 520 is taken to block 550 where a busy signal is submitted as a response to the carrier network. If available, the NO branch of decision block is take to blocks 560 and 570 where the microprocessor 350 accepts the call, rings the targeted analog device, monitors the switch hook of the targeted analog device, and activates the analog call upon the lifting, or otherwise enabling, the switch hook of the targeted analog device. Referring again to block 515, if the incoming call is detected to be a digital call, the DIGITAL branch of decision block 515 is taken to blocks 530 and 540. At block 530, all incoming set up messages for digital calls are passed to the S-bus 22. D channel echo bits are used to allow any digital device on the S-bus to initiate transmission over the D-channel at block 540.

Continuing with FIG. 6, upon completing D channel control processing for incoming analog and digital signals (FIG. 5), the microprocessor 350 then continues, at block 605, with D channel control processing for outgoing analog and digital signals where at block 610 the nature of an outgoing call is determined. If an analog call is detected, the ANALOG branch is taken from the decision block 610 to block 620, where the status of a dial tone at the requesting analog device is monitored. The microprocessor 350 waits for a number to be entered by the requesting analog device, and if no number is entered within a "time out" period, the YES branch of decision block 620 is taken to block 630 where an "off hook" signal is sent to the requesting device. Otherwise, the NO branch of decision block is taken to block 635 where the microprocessor awaits a valid number from the requesting analog device, and while this has not yet occurred, the NO branch of decision block 635 serves as input to the same block 635 and serves to "wait" or "hold" until a valid number has been entered. Otherwise, the YES branch of decision block 635 is taken to block 640 where an the microprocessor 350 issues instructions to initiate and outgoing analog call. These instructions command the microprocessor to connect the requesting analog device to a designated telephone number. Upon completing the instructions in block 640, the availability of the device associated with the designated telephone number is checked, and if busy, the YES branch of decision block 645 is taken to block 650 where a busy tone is transmitted to the requesting analog device. However, if the device associated with the designated telephone number is not busy, the NO branch of decision block 645 is taken to block 655 where the call is completed. With the call path completed, the adapter 10 serves to interface between the requesting analog device and the device associated with the designated telephone number, and further serves to convert signals between an analog form, associated with the requesting analog device, and a standardized digital form, associated with the two wire subscriber loop.

Referring again to block 610, if a digital outgoing call has been requested, the DIGITAL branch of decision block 660 is taken to block 670 where D channel echo bits are used to allow any digital device on the S-bus to gain access to the network to initiate transmission over the D channel.

The adapter's 10 primary responsibilities are to control all D channel signal transfers between the network and analog devices, and to act as a routing mechanism and "relay" with respect to D channel signal transfers running between the network and digital devices attached to the S bus 22 (relay in the sense that the adapter does not alter the information context or form of the signals being transferred).

It is to be understood that other connections may be made, with another option presently contemplated being one in which the adapter 10 could be provided with an RS 232 port for connecting to devices that are adapted for RS 232 signalling. In that configuration, the adapter 10 could act as the master with respect to originating D channel signals to the network and interpreting D channel signals coming from the network (converting non-ISDN interface functions into an ISDN acceptable form relative to devices attached to its RS 232 port). In converting non-ISDN interface functions into an ISDN acceptable form, the processing of incoming digital signals could include additional function at the adapter 10 such as checking whether the targeted digital device is available, responding with a busy signal, or accepting the digital call and activating the 64 kbps digital B channel. Moreover, in converting non-ISDN interface functions into an ISDN acceptable form, the processing of outgoing digital signals could include additional function at the adapter 10 such as initiating an outgoing call, checking whether the device associated with the designated telephone number is available, posting a "no-connect" signal if unavailable, or completing a call path to the device associated with the designated telephone number.

Referring next to FIG. 7, flow diagrams are provided to illustrate in detail the operation of the microprocessor 350 during block shown at 480 in FIG. 4 when B channel processing of digital voice or high speed date is actually occurring. Again, the coding of the process steps used by the microprocessor 350 into instructions suitable to control the microprocessor 350 will be understood by one having ordinary skill in the art.

The flow chart of FIG. 7 is begun at start block 705, and initially it is determined whether an analog call is active, and if not, the NO branch of decision block 710 is taken to block 790 where B channel digital data is processed. Otherwise, if an analog call is active, the YES branch of decision block 710 is taken to block 720 where the state of the originating analog device is checked. If an "off hook" state of the originating analog device is sensed by the telephone interface 330, the OFF HOOK branch of decision block 720 is taken to block 730 where a dial tone is transmitted to the originating analog device. If a "dialing" sequence is recognized by the telephone interface 330, the DIALING branch of decision block 720 is taken to block 740 where DTMF decode information is sent via the D channel to be processed by ISDN access controller 390. If a call is currently "active", the ACTIVE branch of decision block 720 is taken to block 750 where data is taken from the telephone interface 330 and transmitted over an ISDN B channel at block 750.

Continuing with FIG. 7, the status of an incoming analog call is checked, and if a new call is incoming, the INCOMING branch of decision block 760 is taken to block 780 where a ring signal is applied to the analog telephone addressed by the incoming call. If the status of the incoming signal is that of a currently active signal, the ACTIVE branch of decision block 760 is taken to block 770 where the incoming signal is received by telephone interface 330 and transmitted to the analog telephone addressed by the incoming call via the analog hybrid 340. Having processed analog channel information, digital information is processed at block 780.

While the invention has been described above in connection with a preferred embodiment therefore as illustrated by the drawings, those of skill in the art will readily recognize alternative embodiments of the invention can be easily produced which do not depart from the spirit and scope of the invention as defined in the following claims.

What is claimed is:

1. A communication system for connecting analog or digital devices in a subscriber premise to an ISDN digital network via "POTS" (plain old telephone service) wires linking said subscriber premise to said network, wherein said POTS wires consist of a first set of wires connected to said network and a second set of wires connected to said analog devices and not connected to said network, said system comprising:

an adapter for processing signals;
first connecting means connecting said adapter to both said first and said second sets of POTS wires; said first connecting means serving to (a) transfer digital signals between said adapter and said first set of POTS wires such that digital signals in predetermined instances are conducted between said adapter and said network via said first set of POTS wires, and (b) transfer analog signals between said adapter and said second set of POTS wires such that analog signals in predetermined instances are conducted between said adapter and said analog devices via said second set of POTS wires; and
converting means in said adapter for converting signals transferred between said network and said first connecting means so as to sustain communication between said network and said analog devices, via said first and second sets of POTS wires and said first connecting means; said converting means converting said signals between forms uniquely suited to said network and said analog devices.

2. The apparatus as in claim 1, further comprising:
a second connecting means for connecting said adapter to said digital devices; and
said converting means in said adapter further converting signals transferred between said network, said first connecting means and second connecting means so as to sustain communication concurrently between said network and said digital devices, via said first set of POTS wires, said first connecting means and said second connecting means; said converting means further converting said signals between forms uniquely suited to said network, and said digital devices.

3. An arrangement for linking both analog and digital devices in a subscriber premise to a digital telephone network, said arrangement using pre-existing telephone wiring and wall jacks in said premises that could be used for providing analog signalling services to said premise, said wiring comprising two discrete pairs of signal wires, said wall jacks including at least two jacks, said arrangement comprising:

means connecting one of said two pairs of signal wires to said digital telephone network while isolating the other of said two pairs of signal wires from said network, said other of said two pairs of signal wires being connected to said analog devices; and
signal conversion means pluggably connected to any one of said wall jacks for interfacing between said two pairs of signal wires and both digital and analog devices located in said premise; said signal conversion means comprising:
first converting means, coupled between said one of said two pairs of signal wires and said digital devices, for converting two wire subscriber loop signals between a first standardized digital form used by said carrier network and a second standardized digital form used by said digital devices, and
second converting means, coupled to said one and said other of said two pairs of signal wires, for converting two wire subscriber loop signals between said first standardized digital form used by said carrier network and an analog form used by analog devices connected to any wall jack other than the one to which said conversion means is connected.

4. An arrangement for adapting a telephone subscriber premise containing pre-existing telephone wiring to use both analog and digital devices while being served by a telephone carrier network providing only two wire subscriber loop digital service; wherein said wiring comprising two pairs of "internal" telephone wires extending between a junction box that connects said premise to said carrier network and multiple modular telephone jacks situated on inside walls of said premise; said arrangement comprising:

means at said junction box forming a connection exclusively between one of said pairs of wires and a pair of wires external to said premise extending to said telephone carrier network; and digital conversion apparatus connected to both of said pairs of internal wires at any one of said inside wall jacks through a modular plug; said conversion apparatus receiving and transmitting only baseband digital signals via said one of said pairs of wires that is connected to said telephone network at said junction box; said conversion apparatus receiving and transmitting only analog signals via the other pair of internal wires that is not connected to said carrier network at said junction box; said analog signals being conveyed thereby between said any one inside wall jack and an analog telephone device having an ordinary plug connection at any other said inside jack to only said other pair of internal wires; said conversion apparatus comprising:

a bus interface for connecting to one or more digital devices in said premise;

digital signal conversion means connected to said bus interface for converting digital signals between a form used at said bus interface and a standard digital channelized form used in said telephone carrier network;

analog to digital signal conversion means connected to said other pair of internal wires for converting signals between an analog form, used by an analog device attached to said other pair of wires at said any other inside jack, and said standard digital channelized form used by said telephone carrier network; and means, coupled between said one pair of internal wires that connects to said network and both said converting means, for selectively transferring digital signals, arranged in said standard digital channelized form, between said one pair of internal wires and each of said conversion means whereby signals representing digital data and analog functions such as voice in predetermined instances are concurrently transported between said network and digital and analog devices respectively coupled to said digital form conversion means and said analog to digital conversion means.

5. A method for linking both analog and digital devices using pre-existing telephone wires to a two wire subscriber loop digital carrier network, wherein said network is connected to one pair of said pre-existing telephone wires and analog devices are connected to another pair of said pre-existing telephone wires, said method comprising:

converting signals on said two wire subscriber loop, carried on said one pair of pre-existing telephone wires, between a standardized digital form used by said network and an analog form used by said analog devices; and concurrently converting signals on said two wire subscriber loop, carried on said one pair of pre-existing telephone wires, between a first standardized digital form used by said network and a second standardized digital form used by said digital devices.

6. A telephone communication system comprising:

an ISDN network;

an adapter for processing signals;

at least one analog device;

a first pair of telephone wires operatively connected to said adapter and said ISDN network, said first pair of telephone wires providing a communication path between said adapter and said ISDN network;

a second pair of telephone wires operatively connected to said adapter and said analog devices, said second pair of telephone wires providing a communication path between said adapter and said analog devices; and means, within said adapter, for converting signals transferred between said network and said analog devices so as to sustain communication between said network and said analog devices, via said first and second pairs of wires; said converting means converting said signals between forms uniquely suited to said network and said analog devices.

7. A telephone communication system as in claim 6, further comprising:

at least one digital device;

a connecting means for connecting said adapter to said at least one digital device; and said means, within said adapter, further converting signals transferred between said network and said digital devices so as to sustain communication between said network and said digital devices via said first pair of wires and said connecting means; said converting means converting said signals between forms uniquely suited to said network and said digital devices.

8. A telephone communication system as in claim 7, wherein said means, within said adapter, concurrently sustains communication between signals on said network and said analog devices on said first and second pairs of wires and between signals on said carrier network and said digital device via said first pair of wires and said connecting means.

* * * * *